Feb. 3, 1931.  A. F. O. KAISER  1,790,752

DUAL BALL PULLEY

Filed Nov. 25, 1929

INVENTOR,
Alvain F. O. Kaiser.
BY David E. Lain,
ATTORNEY.

Patented Feb. 3, 1931

1,790,752

UNITED STATES PATENT OFFICE

ALVAIN F. O. KAISER, OF BELLINGHAM, WASHINGTON

DUAL-BALL PULLEY

Application filed November 25, 1929. Serial No. 409,543.

My invention relates to improvements in dual-ball pulleys, for use in place of sheaves, and has for an object to provide a simple pulley having no bearings in which the rope or cable used therein bears directly on the balls.

Figure 1:
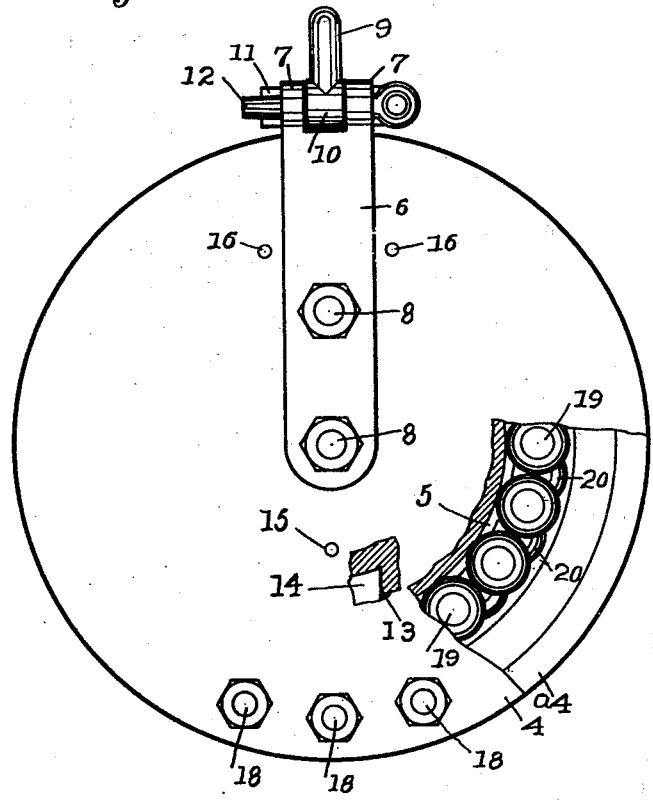
Figure 2:
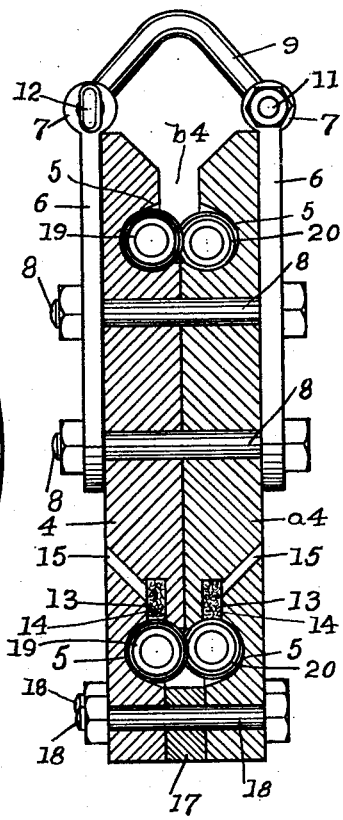
Figure 3:
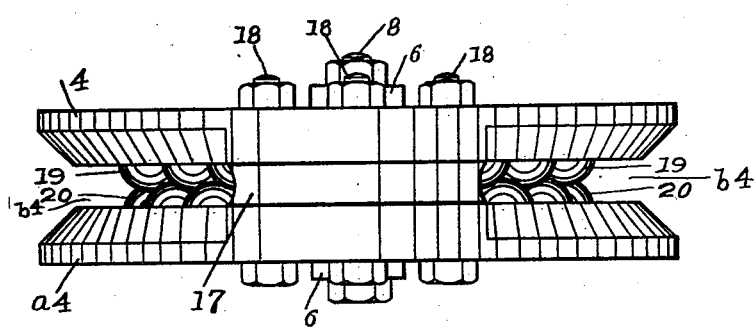

I attain this and other objects of my improvement with the mechanism illustrated in the accompanying sheet of drawings, forming a part of this specification, in which Figure 1 is a side elevation of my pulley, Fig. 2 is an edge elevation of Fig. 1 in section on a medial vertical plane, and Fig. 3 is a bottom plan view of the lower edge of the pulley.

Similar characters refer to similar parts throughout. Certain parts are broken away to show other parts hidden thereby.

With more particular reference to the designated parts: 4 and $a4$ are two circular cheek plates alike in all respects in which are made similar concentric ball races 5, 5 which face each other in the opposite contacting surfaces of the cheeks. Eye bars 6, 6 are oppositely disposed on the outside of the assembled plates and clamped thereto by bolts 8, 8 extended through registering openings in the plates and bars to maintain ball races 5, 5 concentric with each other.

The opposite faces of the plates external to the races 5 are cut away to provide slot $b4$ for access of the rope to said races.

Eyes 7, 7 on the outer ends of bars 6, 6 are bifurcated to receive the end eyes 10 of the strap 9 which are connected to said bars by bolt 11 and pin 12.

A chamber 13 is provided in the upper wall of the race in each plate at the lower part thereof as at 13 in which is embedded a piece of felt 14 to hold oil and supply it to the balls as they pass thereby. Downwardly inclined oil hole 15 provides access for oil to each of said pieces of felt. Also, downwardly inclined oil holes 16, 16 in the upper part of each cheek plate provide access for oil to the balls when in the upper parts of the races.

Filler block 17 occupies the space between plates 4 and $a4$ at the lower parts thereof. Said intervening block is retained in place and the plates clamped thereon by bolts 18 through registering openings in said plates and block. A set of balls 19 is supplied for the race in plate 4. The diameter of the race and that of the balls provide for the complete filling of the race by said balls when the pulley is operatively employed. In a similar manner balls 20 are suited to the race in plate $a4$.

Ball races 5, 5 are relatively disposed to provide for the engagement of the race full of balls 19 by the race full of balls 20 as they are closely associated with surfaces bearing each on the other with the center of each ball in one race opposite the point of contact between adjacent balls in the race opposite thereto.

In operation; to install a rope in my pulley, pin 12 is withdrawn and the strap 9 is swung open on hinge bolt 11 providing room for the rope to pass into pulley slot $b4$. The rope is then placed on balls 19, 20 and the strap 9 reengaged by pin 12 when the pulley and rope are properly associated for operation.

Having thus disclosed my invention, what I claim as new therein and desire to secure by Letters Patent is,—

A dual-ball pulley consisting of a pair of similar cheek-plates each having a similar annular ball race therein adapted to be concentrically disposed and clamped together, balls in each of said ball races, said ball races being relatively disposed to cause the balls in one of said plates to engage with the balls in said other plate with each of said balls in one race protruding between and bearing on two of the balls in said other race, the opposite walls of each plate outside of said ball races being spaced apart to provide a rope slot, means to clamp said pair of cheek plates together in operative relation, and hitching means fastened to said cheek plates to provide hauling engagement means therefor.

ALVAIN F. O. KAISER.